US011763182B1

(12) United States Patent
Newcombe

(10) Patent No.: US 11,763,182 B1
(45) Date of Patent: Sep. 19, 2023

(54) SOFTWARE FACILITATING DECISION MAKING METHOD

(71) Applicant: Jared Anders Newcombe, Caledon (CA)

(72) Inventor: Jared Anders Newcombe, Caledon (CA)

( * ) Notice: Subject to any disclaimer, the term of this patent is extended or adjusted under 35 U.S.C. 154(b) by 607 days.

(21) Appl. No.: 16/868,898

(22) Filed: May 7, 2020

(51) Int. Cl.
*G06N 5/04* (2023.01)
*G06N 5/043* (2023.01)
*G06N 5/02* (2023.01)

(52) U.S. Cl.
CPC .............. *G06N 5/043* (2013.01); *G06N 5/02* (2013.01)

(58) Field of Classification Search
CPC .................................. G06N 5/04; G06N 5/02
See application file for complete search history.

(56) References Cited

U.S. PATENT DOCUMENTS

| | | | | |
|---|---|---|---|---|
| 5,822,743 A * | 10/1998 | Gupta | ...................... | G06N 5/04 706/50 |
| 8,321,788 B2 * | 11/2012 | Akao | ................... | G06F 11/0751 715/708 |
| 2002/0035486 A1 * | 3/2002 | Huyn | ...................... | G09B 7/02 705/3 |
| 2008/0010254 A1 * | 1/2008 | Settimi | ................... | G06Q 10/06 |
| 2008/0208786 A1 * | 8/2008 | Serrano-Morales | ... | G06N 5/025 706/47 |
| 2011/0131172 A1 * | 6/2011 | Herzog | ................ | G09B 29/007 709/205 |
| 2014/0058990 A1 * | 2/2014 | Benson | ................. | H04L 67/025 706/14 |
| 2015/0356474 A1 * | 12/2015 | Day | ..................... | G06Q 10/067 705/7.11 |
| 2015/0379419 A1 * | 12/2015 | Reddington | ..... | G06Q 10/06375 706/14 |

* cited by examiner

*Primary Examiner* — Phenuel S Salomon
(74) *Attorney, Agent, or Firm* — Gulf Coast Intellectual Property Group

(57) ABSTRACT

A decision making method configured to facilitate a decision process wherein the method of the present invention provides the ability for a user to progress through the decision making process in incremental layers. The present invention in its preferred embodiment is embodied in software application that is operable via a graphical interface presented to a user on a conventional computing device or as a software application on a mobile computing device. The method of the present invention includes the presentation of an inquiry wherein the inquiry answer is utilized to establish the scenario parameters for the desired outcome or objective. The present invention provides a repository of answers and of resources wherein the answers and resource selections provided are selected by a user in each incremental layer of the decision making process. The present invention provides categorization of each layer scenario and present answers and resources based on the categorization.

9 Claims, 3 Drawing Sheets

SOFTWARE FACILITATING DECISION MAKING METHOD

PRIORITY UNDER 35 U.S.C Section 119(e) & 37 C.F.R. Section 1.78

This nonprovisional application claims priority based upon the following prior United States Provisional Patent Application entitled: Decision Making System, Application No.: 62/848,762 filed May 16, 2019, in the name of Jared Anders Newcombe, which is hereby incorporated by reference for all purposes.

FIELD OF THE INVENTION

The present invention relates generally to decision assistance systems and/or apparatus, more specifically but not by way of limitation, a software application that is operable to facilitate assistance to a user or group of users with a chosen objective wherein the present invention provides parameters such as but not limited to industry best practices and clearly defined objectives facilitating a decision making method process in order to achieve a desired objective.

BACKGROUND

As is known in the art, problem solving tools and apparatus are well known. Examples range from process flow software configured to achieve a desired end state to more simple tools such as but not limited to manual checklists. The overall objectives of these systems and apparatus are to either facilitate a desired end state or to arrive at a solution to a problem based on inputted parameters. Many existing tools are structured such that they provide an administration of checklists that are configured to progressively move a user from a starting point to an endpoint. These tools have many shortcomings and deficiencies. Most of these tools are not problem specific and are focused on a methodology. While these may be somewhat effective these tools will ignore the uniqueness of either the industry or unique parameters that may be applicable to the current issue that is attempting to be resolved by the user.

Another shortcoming of generic problem solving tools are that they do not provide objectives to accomplish a desired mission. By only providing a desired end state users may not be presented with options that are needed in a dynamic environment that would facilitate a problem solution that incorporates parameters such as but not limited to best practices.

It is intended within the scope of the present invention to provide problem solving tool that is configured to assist users with a specific mission and/or problem wherein the tool provides clear objectives that are mission specific and wherein the tool provides accommodation of a dynamic environment.

SUMMARY OF THE INVENTION

It is the object of the present invention to provide a decision making tool that is configured to provide users thereof management of an objective oriented mission wherein it is contemplated within the scope of the present invention that the decision making tool can be provided in either a software format or a physical embodiment.

Another object of the present invention is to provide a software application configured to facilitate a decision making method that is configured to provide improved command and control within a mission or towards an objective wherein the parameters and categories of the mission or objective are presented in a wheel format in the preferred embodiment of the present invention.

A further object of the present invention is to provide a decision making tool that is configured to provide users thereof management of an objective oriented mission wherein the categories and parameters of the present invention are customizable towards the objective, goal or mission.

Still another object of the present invention is to provide a software application configured to facilitate a decision making method that is configured to provide improved command and control within a mission or towards an objective wherein the present invention further functions to be a training tool for recognition based decision making.

An additional object of the present invention is to provide a decision making tool that is configured to provide users thereof management of an objective oriented mission wherein the segmented portions of the wheel of the present invention are movable with respect to one another to facilitate the presenting of options for strategies and objectives in order to achieve problem resolution or accomplishment of a mission and/or objective.

Yet a further object of the present invention is to provide a software application configured to facilitate a decision making method that is configured to provide improved command and control within a mission or towards an objective wherein the present invention will direct users towards industry best practice solutions as problems are framed and strategies are selected.

Another object of the present invention is to a provide a decision making tool that is configured to provide users thereof management of an objective oriented mission wherein the present invention is structured to accommodate feedback in order to permit adjustment and/or reprioritization current direction.

An alternate object of the present invention is to provide a software application configured to facilitate a decision making method that is configured to provide improved command and control within a mission or towards an objective wherein the software of the present invention allows for multiple users to be operably engaged with a common mission and wherein feedback is collected from each user.

Still a further object of the present invention is to provide a decision making tool that is configured to provide users thereof management of an objective oriented mission wherein feedback from multiple users is disseminated to entities that are in command and control of the objective and/or mission so as to provide oversight thereof.

An additional object of the present invention is to provide a software application configured to facilitate a decision making method that is configured to provide improved command and control within a mission or towards an objective wherein the present invention facilitates the engagement of users in a continual decision making loop.

A further object of the present invention is to provide a decision making tool that is configured to provide users thereof management of an objective oriented mission wherein the present invention will provide industry best practices under hypothesis to a user during traversal through the process of the present invention.

An alternative objective of the present invention is to provide a software application configured to facilitate a decision making method that is configured to provide improved command and control within a mission or towards an objective wherein the present invention further includes the ability to synchronize input from multiple users working on a common mission and/or objective.

Yet a further object of the present invention is to provide a decision making tool that is configured to provide users thereof management of an objective oriented mission wherein it is further contemplated within the scope of the present invention that incorporation of tactical worksheets could be included.

An additional objective of the present invention is to provide a software application configured to facilitate a decision making method that is configured to provide improved command and control within a mission or towards an objective wherein the present invention provides management of incoming information and facilitates adjustment of approaches so as to potentially alter a best practice to achieve a desired outcome.

Still another object of the present invention is to provide a decision making tool that is configured to provide users thereof management of an objective oriented mission wherein the preferred embodiment of the present invention is a collection of rotational wheels or graphical representation thereof that are segmented into mission or objective related categories wherein the rotational wheels can be embodied via software or have a physical embodiment.

Another objective of the present invention is to provide a software application configured to facilitate a decision making method that is configured to provide improved command and control within a mission or towards an objective wherein the process of the present invention provides reduction of duplication and further facilitates unification of multiple entities.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
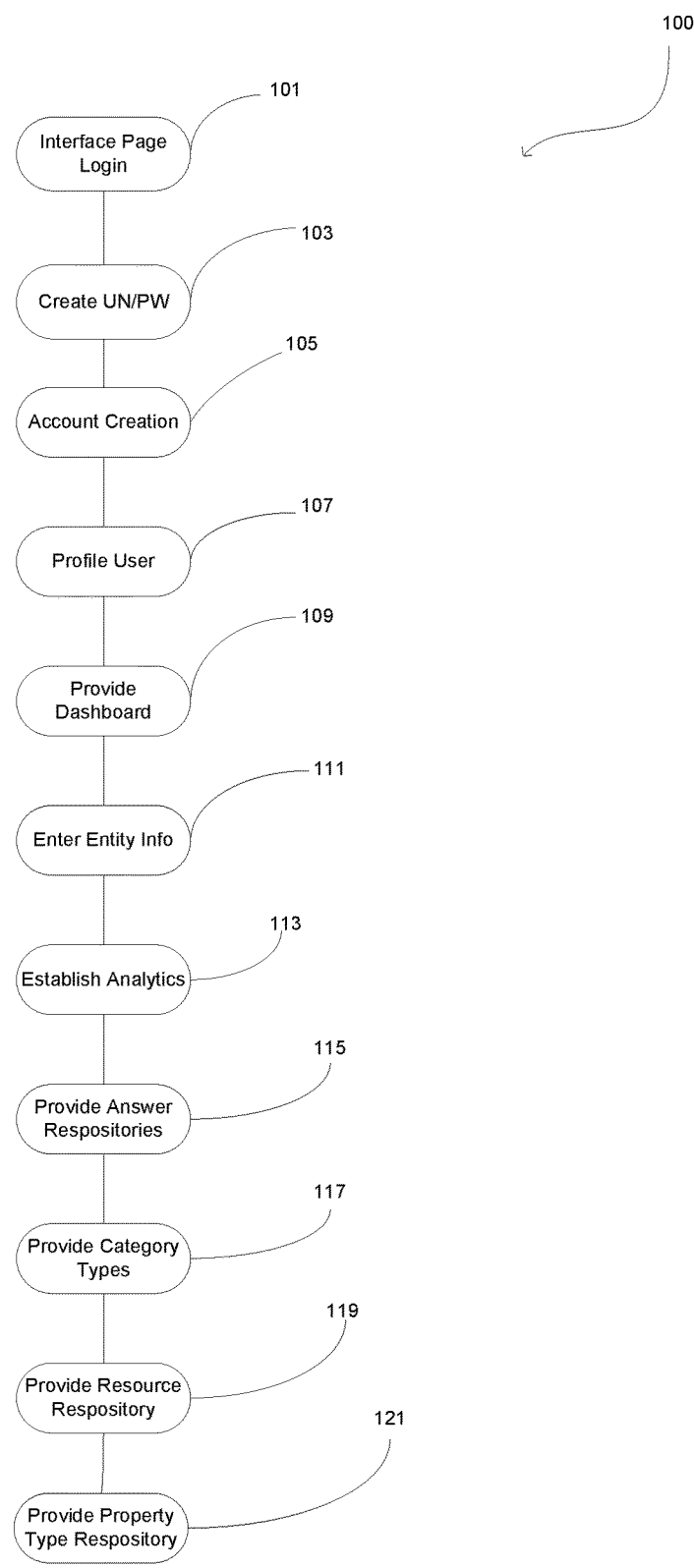
FIG. 1 is an outline of the interface workflow of the present invention.

References now to the drawings submitted herewith, wherein various elements depicted therein are not necessarily drawn to scale and wherein through the views and figures like elements are referenced with identical reference numerals, there is illustrated decision making method 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Now referring to the Figures submitted as a part hereof, the decision making method 100 is a software based method operable to facilitate a decision process by either an individual or a group of individuals. As is further discussed herein the decision making method 100 facilitates a procedure wherein layers of parameters are provided and advanced through dependent upon occurrences in the previous layer or stage. It is contemplated within the scope of the present invention the present invention could be either a software application interface with a mobile application or via a traditional computing device utilizing a internet based interface. Furthermore, while a software based execution of the present invention is preferred, it is contemplated within the scope of the present invention that a physical embodiment could be provided in order to execute the method of the present invention. It should be understood within the scope of the present invention that the decision making method 100 could be utilized in simulation practice for either a single or group of individuals. Furthermore, the decision making method 100 can be utilized to proctor a training exercise for a specialized group or individual wherein the proctor can evaluate the decision outcome and provide feedback.

In FIG. 1, in step 101, the interface page is provided. As previously mentioned herein decision making method 100 in its preferred embodiment is a web based or mobile software application. The interface page is a conventional graphical interface that provides the ability for a user to either login to the application of the present invention or create an account in order to initiate use thereof. In step 103, a new user will be provided an icon for creating a username and password. In step 105, ensuing processing of a user's username and password a unique account is created for the user. It should be understood within the scope of the present invention that the account type could be either an administrator account or a user account. Step 107, the user will complete a user profile wherein the present invention will collect and store the profile parameters and associate with the user's account. It should be understood within the scope of the present invention that the user profile could include parameters such as but not limited to name, age, geographic location and occupation.

In step 109, subsequent to a user creating an account and logging into the graphical software interface of the decision making method 100, the user is provided with a dashboard. The dashboard is a conventional graphical interface providing a framework to customize content specific to the user or the entity for which the user is a member of that includes but is not limited to access management, analytics review and data entry for layer parameters which is discussed further herein. Step 111, an administrative user will enter entity information such as but not limited to entity type, divisions, groups, shifts and other relevant information about the entity. In step 113, establishment of analytics tracking is performed. The analytics tracking provides the ability for administrators of the decision making method 100 to measure and record performance measurements in real time as user progress through the layers of the method facilitated by the present invention. The analytics track data such as but not limited to incident type, scenarios and other data wherein the analytics can be used to identify the percentages of success for each layer the user progresses through during execution of the decision making method 100.

In step 115, answer repositories are provided. Answer repositories are data banks that are specific to a particular scenario wherein the answer repositories provide data sets that are available to users during each layer of the method of the present invention. It should be understood within the scope of the present invention that a multitude of data sets pertaining to numerous alternate categories are provided within the scope of the present invention. Step 117, the category types for the decision making method 100 are provided. The category types are the fields or areas of the types of problems for which the decision making method 100 will be utilized to arrive at a decision to solve a particular problem or scenario within the category. It should be understood within the scope of the present invention that numerous categories could be provided such as but not limited to those related to emergency management.

In step 119, a resource repository is provided. The resource repository provides information on assets and services such as but not limited to apparatus, utilities and vehicles that are available to a user to facilitate remediation of a problem being addressed by a decision outcome via the decision making method 100. The resources are specific or relevant to the particular category type and are further provided with information such as but not limited to geographic location and availability. The resource data is actively maintained in order to ensure availability of deployment should a resource be required as part of the implementation of the solution arrived upon through utilization of the decision making method 100.

Step 121, a property type repository is provided. The property type repository contains data on geographic locations, structure type and other parameters about property that may be a focus of the problem in which users are utilizing the decision making method 100 to remediate a problem. The property types are used for scenario categorization as well as being able to provide specific information about a particular location and any structure thereon. It should be understood within the scope of the present invention that the aforementioned repository data could be provided in any format such as but not limited to pictorial or text data.

Figure 2:
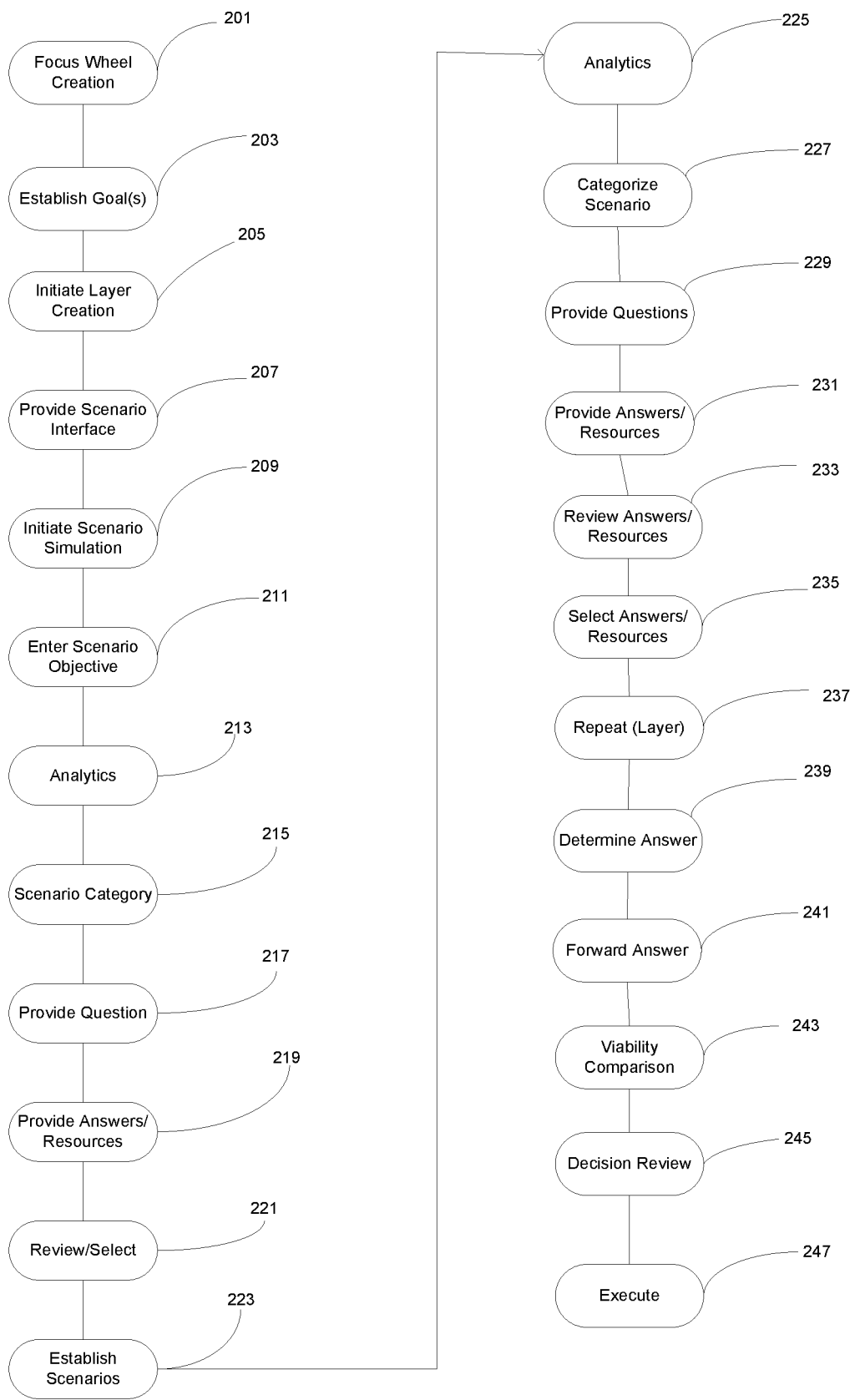
FIG. 2 is a flowchart outline of the focus wheel and decision process facilitated by the method of the present invention.

Now referring to FIG. 2 herein, the focus wheel creation is initiated in step 201. In the present invention the term focus wheel is referring to the driving of decision making and the various stages or layer contained within the decision making process facilitated by the present invention. The focus wheel can be presented graphically to the users of the decision making method 100 and starts with the desired end state or objective that the user needs to accomplish or achieve. The focus wheel is constructed in stages or layers consisting of scenarios and/or questions wherein answers and data for each are provided utilizing the repositories discussed herein. The various answer types and data facilitate alternate outcomes wherein each outcome is identified with a probability of success towards achieving the desired end state or objective through utilization of analytics referenced herein. Step 203, a user will establish a goal or desired end state. The goal or end state is the desired targeted outcome of the problem through which the user will engage in the decision making method 100 to remediate or solve.

In step 205, the software of the present invention will initiate creation of the first layer. Step 207, a user will be provided with a scenario interface icon wherein the user will select the scenario pertaining to their desired goal or objective. In step 209, the software of the present invention will initiate the scenario simulation for the first layer. In step 211, the user will enter the scenario objective. In step 213, analytics are utilized to categorize the scenario. Step 215, the scenario category is established. In step 217, the user is provided with a question for the first layer of the established scenario. The question can be provided to them based on the analytics of the scenario and the scenario objective. Step 219, a set of answers, resources and property types, if applicable are provided to the user. The answers and resources are selected from the repositories for each discussed herein above. The answers and resources provided are viable options as determined utilizing data analytics based on the scenario and desired goal or objective. In step 221, the user will review and select from the provided lists of answers and resources and answer and at leas one resource if applicable that they feel is the best alternative for the current layer of the scenario. In step 223, the user will establish the scenario's second layer or stage based on the answers and resources selected from the preceding scenario layer. Step 225, the software of the present invention will apply analytics to categorize the scenario of the second layer of the decision method of the present invention.

In step 227, categorization of the second layer scenario will be identified. Step 229, the user will be provided with a question specific to the second layer and the category thereof. The aforementioned question is provided by the software of the present invention based on analytics incorporated as a part thereof. In step 231, the user will be provided with a data set of answers and resources wherein the answer and resources are specific to the scenario layer and are provided from the repositories discussed herein. Step 233, the user will review the provided answers and resources provided to them in the second layer of the scenario. In step 235, the user will select an answer and if applicable a desired resource that they feel is the best option for the current layer of the scenario for which they are utilizing the software of the present invention to facilitate a decision. In step 237, a user can repeat the aforementioned process for a layer of the decision making process facilitated by the software of the present invention as described herein above or if applicable move forward with the answers and resources compiled. It should be understood within the scope of the present invention that a single layer could be all that is necessary for the decision making method 100 of the present invention or a multitude of layers could be created.

In step 239, a final answer and resources are selected by the user. The final answer is an amalgamation of the answers and resources selected in each layer of the scenario wherein the answers and resources selected in each layer resulted in a particular directional outcome to conclude on the final decision parameters that a user believes will achieve the initial desired end state or objective. Step 241, the final answer of the user can be forwarded for review by either a proctor, industry experts or other relevant professionals. The review process of step 241 can additionally be executed by the software of the present invention wherein the probability of success of achievement of the desired end state or objective is evaluated base on analytics and is provided to the user. In step 243, a viability comparison of the selected final answer is provided to a user wherein this viability comparison includes but is not limited to success probability data. Step 245, a review of the decision obtained utilizing the method of the present invention is performed. In step 247, the user will then either execute the parameters of the final answer derived by the decision making method 100.

Figure 3:
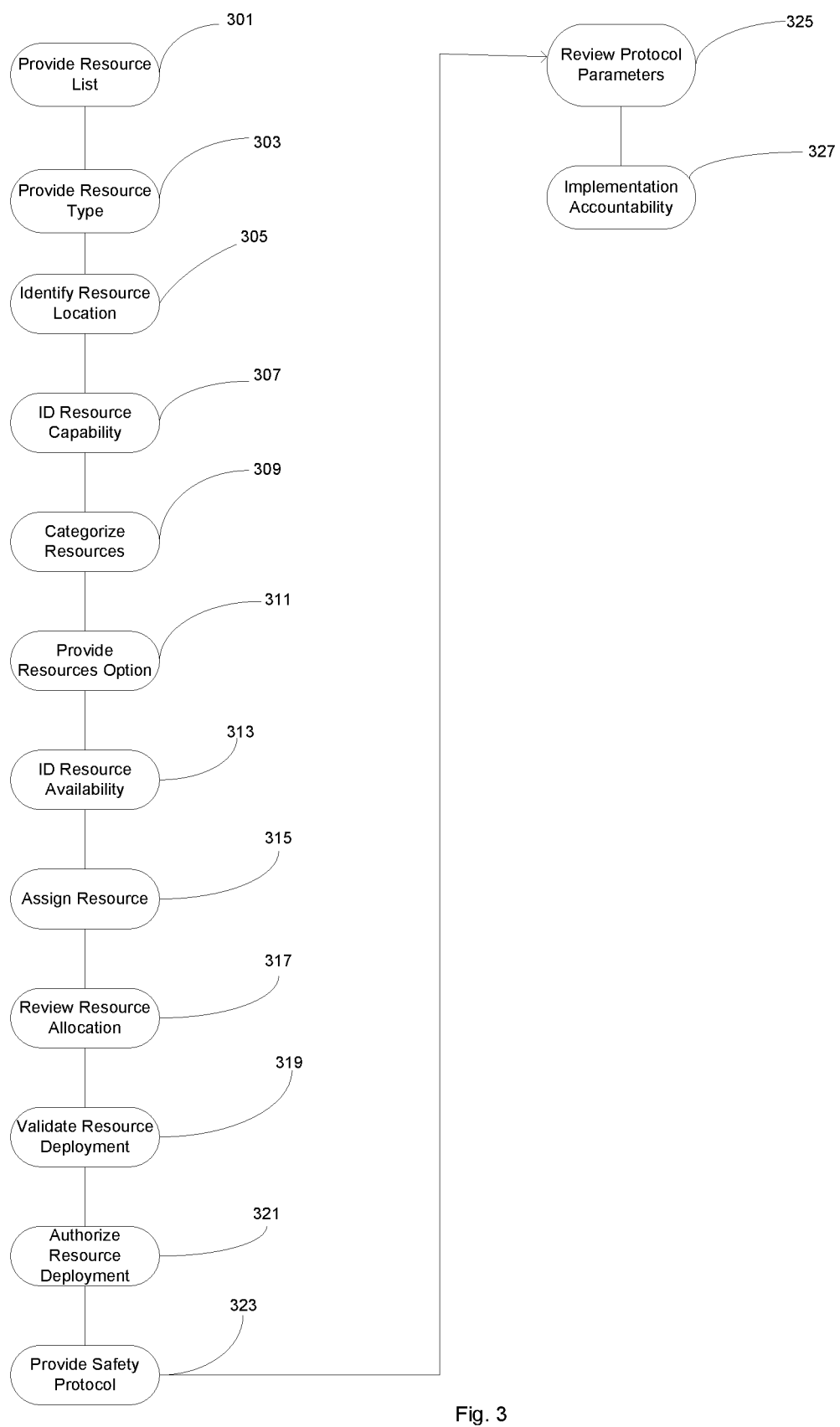
FIG. 3 is a flowchart of the operation of the resource repository of the present invention.

Referring now to FIG. 3 submitted as a part hereof, the process of operating and integrating the resource repository of the present invention is outlined therein. The operational flow of the resource repository is designed to identify, control and facilitate deployment of resources, if needed, towards the desired end state or objective of the focus wheel. In step 301, a resource list is provided to the operator of the decision making method 100 for entry into the software so as to be stored in the resource repository. It should be understood that the resource list is not static but dynamic and updated based on changes to available assets or conditions thereof. Step 303, the resource type is identified and entered. In step 305, the resource location is entered in to be stored and available data parameter for the user when interacting with the resource repository. In step 307, the resource capability is identified and recorded as part of the data entered into the resource repository. By way of example but not limitation, if the resource was a ladder truck capable of reaching six stories this data would be entered into the resource repository. In step 309, the resources entered within the resource repository are categorize into various applicable categories such as but not limited to emergency management.

In step 311, the applicable resources specific to the scenario category of the layer of the decision making method of the present invention are presented to the user during the presentation of answers and repositories. In step 313, the availability of the resource will be identified and presented to the user during the evaluation of the answers and resources provided to the user from the repositories. In step 315, if a user selects a suggested resource the resource is temporarily assigned to the user. Step 317, the resource allocation is reviewed by the user and also, if desired, an owner of the resource or a person in charge thereof. In step 319, the potential of deployment of the resource is validated. Step 321, if the resource allocated is included in the final answer of the decision making process then authorization of the deployment of the resource is requested and obtained. In step 323, a user is provided a safety protocol and procedure of execution, if relevant, for the provided resource is offered to the user. Step 325, a review of the safety protocol parameters are executed by the user prior to the utilization of the deployed resource. Lastly, in step 327, the implementation of accountability of the deployed resource and its user are initiated. This step can include but is not limited to the collection and review of protocol parameters, performance metric review and event outcomes.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A decision making method configured to facilitate achievement of a desired end state or objective for a user attempting to solve a problem wherein the decision making method comprises the steps of:
   providing a user interface, said user interface being provided via a computing device;
   accessing the user interface, wherein the user accesses the user interface via the computing device;
   creating an account, wherein the user creates an account to be stored on the computing device using the user interface, wherein the account is either a user account or an administrator account;
   providing a plurality of category types, wherein the plurality of category types are organized by fields of discipline in which the decision making method is utilized to solve a problem therein;
   providing an answer repository, said answer repository containing a plurality of potential answers to questions that are posed to the user during engagement with the decision making method;
   providing a resource repository, said resource repository containing information about a plurality of resources available for deployment to achieve the desired end state or objective;
   initiating a focus wheel, wherein the focus wheel provides a framework to navigate the user through the decision making method;
   establishing an end goal or desired outcome, wherein the user enters an end goal or desired outcome postulated to solve the problem;
   creating a plurality of objective layers, wherein the plurality of objective layers are organized to incrementally focus the user towards the end goal or desired outcome;
   determining a scenario for a first layer of the plurality of objective layers, wherein the scenario for the first layer is determined through presenting a question to the user;
   categorizing the scenario of the first layer;
   providing a question pertaining to the scenario of the first layer;
   providing answers to the user, wherein a plurality of potential answers are provided to the user for selection therefrom and wherein the answers are directed towards the question of the scenario of the first layer;

selecting an answer, wherein the user selects a choice from the plurality of answers provided to the user;

reviewing the plurality of resources presented in the resource repository, wherein the user is presented a subset of the plurality of resources from the plurality of resources of the resource repository, wherein the subset of the plurality of resources is relevant to the scenario of the first layer;

determining a resource to deploy, wherein the user chooses whether or not to deploy a resource in order to complete the first layer scenario process;

establishing at least one additional scenario layer, wherein the at least one additional scenario layer is established by presenting a second question to the user;

categorizing the at least one additional scenario layer;

providing a question pertaining to the at least one additional scenario layer;

providing answers to the user, wherein a plurality of potential answers are provided to the user for selection therefrom and wherein the answers are directed towards the at least one additional scenario layer;

selecting an answer, wherein the user selects a choice from the plurality of answers provided to the user;

reviewing the plurality of resources presented in the resource repository, wherein the user is presented a subset of the plurality of resources from the plurality of resources of the resource repository, wherein the subset of the plurality of resources are relevant to the at least one additional scenario layer;

determining a resource to deploy, wherein the user chooses whether or not to deploy a resource in order to complete the at least one additional scenario layer;

evaluating a probability of success, wherein the user evaluates the probability of success of achieving the desired outcome or end goal;

making a decision about how to achieve the desired outcome or end goal; and executing a determined approach as outlined by the decision created in the decision making method.

2. The decision making method as recited in claim 1, making available the determined approach to at least one additional entity for review.

3. The decision making method as recited in claim 2, and further including the step of providing a geographic location, a capability and an availability of the plurality of resources in the resource repository.

4. The decision making method as recited in claim 3, and further including the step of reviewing deployment of a selected resource and providing authorization thereof.

5. The decision making method as recited in claim 4, and further including the step of providing a property type repository, wherein the property type repository contains data parameters about a plurality of geographic locations and any structure thereon.

6. The decision making method as recited in claim 5, and further including the step of providing analytics, wherein the analytics are utilized to determine a probability of success of the determined approach.

7. The decision making method as recited in claim 6, and further including the step of providing a safety protocol procedure to the user, wherein the safety protocol procedure is specific for resources deployed in order to execute the desired approach.

8. The decision making method as recited in claim 7, and further including the step of monitoring implementation of the resources deployed for accountability.

9. The decision making method as recited in claim 8, and further including the step of reviewing metrics produced by the deployed resources during use thereof.

\* \* \* \* \*